US010885789B2

(12) United States Patent
Rothmund et al.

(10) Patent No.: US 10,885,789 B2
(45) Date of Patent: Jan. 5, 2021

(54) DEVICE AND METHOD FOR LATERAL GUIDANCE ASSISTANCE FOR A ROAD VEHICLE

(71) Applicant: Bayerische Motoren Werke Aktiengesellschaft, Munich (DE)

(72) Inventors: Tobias Rothmund, Oberschleissheim (DE); Tom Kasseckert, Mering (DE); Matthias Beck, Munich (DE)

(73) Assignee: Bayerische Motoren Werke Aktiengesellschaft, Munich (DE)

(*) Notice: Subject to any disclaimer, the term of this patent is extended or adjusted under 35 U.S.C. 154(b) by 0 days.

(21) Appl. No.: 16/110,375

(22) Filed: Aug. 23, 2018

(65) Prior Publication Data
US 2018/0366002 A1 Dec. 20, 2018

Related U.S. Application Data

(63) Continuation of application No. PCT/EP2017/053711, filed on Feb. 17, 2017.

(30) Foreign Application Priority Data

Feb. 24, 2016 (DE) .................. 10 2016 202 830

(51) Int. Cl.
G08G 1/16 (2006.01)
B60W 50/14 (2020.01)
B60W 30/095 (2012.01)
B60W 30/18 (2012.01)
B62D 15/02 (2006.01)
(Continued)

(52) U.S. Cl.
CPC ............. G08G 1/167 (2013.01); B60Q 9/008 (2013.01); B60W 30/095 (2013.01);
(Continued)

(58) Field of Classification Search
CPC .................................. B60W 10/00; G08G 1/00
See application file for complete search history.

(56) References Cited

U.S. PATENT DOCUMENTS 6,388,565 B1 * 5/2002 Bernhard ............... B60Q 9/008
340/435
9,132,837 B2 9/2015 Schlensag et al.
(Continued)

FOREIGN PATENT DOCUMENTS

CN 101132965 A 2/2008
CN 102460535 A 5/2012
(Continued)

OTHER PUBLICATIONS

English translation of EP-2899083-A2.*
(Continued)

Primary Examiner — Shirley Lu
(74) Attorney, Agent, or Firm — Crowell & Moring LLP

(57) ABSTRACT

A device for lateral guidance assistance for a vehicle includes a programmable electronic control unit and a plurality of distance sensors configured to capture obstacles to a side of and/or behind the vehicle within one or more defined warning regions. The device also includes an optical sensor device configured to capture lane markings and/or a lane width of a current lane of the vehicle and/or of a neighboring lane of the vehicle. The programmable electronic control unit is configured such that at least one of the defined warning regions is shifted based on a detected lane change to a new lane.

15 Claims, 2 Drawing Sheets

(51) Int. Cl.
*B60Q 9/00* (2006.01)
*G01S 13/931* (2020.01)

(52) U.S. Cl.
CPC ...... *B60W 30/18163* (2013.01); *B60W 50/14* (2013.01); *B62D 15/025* (2013.01); *G08G 1/165* (2013.01); *B60W 2420/42* (2013.01); *B60W 2554/00* (2020.02); *G01S 2013/93272* (2020.01); *G01S 2013/93274* (2020.01)

(56) References Cited

U.S. PATENT DOCUMENTS

| | | | |
|---|---|---|---|
| 2006/0206243 | A1 | 9/2006 | Pawlicki et al. |
| 2012/0029813 | A1* | 2/2012 | Tajima ................... G08G 1/161 |
| | | | 701/300 |
| 2013/0181860 | A1* | 7/2013 | Le ....................... B60R 21/0134 |
| | | | 342/72 |
| 2014/0324325 | A1* | 10/2014 | Schlensag ....... B60W 30/18163 |
| | | | 701/116 |

FOREIGN PATENT DOCUMENTS

| | | |
|---|---|---|
| DE | 10 2006 012 997 A1 | 9/2007 |
| DE | 10 2006 048 503 A1 | 4/2008 |
| DE | 10 2007 007 540 A1 | 8/2008 |
| DE | 10 2007 015 879 A1 | 10/2008 |
| DE | 10 2007 027 494 A1 | 1/2009 |
| DE | 10 2011 080 928 A1 | 2/2013 |
| DE | 10 2012 204 948 A1 | 10/2013 |
| DE | 10 2013 104 256 A1 | 10/2014 |
| DE | 10 2013 019 112 A1 | 5/2015 |
| EP | 1 052 143 A2 | 11/2000 |
| EP | 2 899 083 A2 | 7/2015 |
| EP | 2899083 A2 * | 7/2015 |
| WO | WO 03/091813 A1 | 11/2003 |
| WO | WO 2006/092431 A1 | 9/2006 |
| WO | WO 2012/103970 A1 | 8/2012 |

OTHER PUBLICATIONS

PCT/EP2017/053711, International Search Report dated May 24, 2017 (Three (3) pages).

German Search Report issued in German counterpart application No. 10 2016 202 830.8 dated Dec. 6, 2016, with Statement of Relevancy (Seven (7) pages).

Chinese Office Action issued in Chinese application No. 201780012232.0 dated Aug. 28, 2020, with partial English translation (Fourteen (14) pages).

* cited by examiner

DEVICE AND METHOD FOR LATERAL GUIDANCE ASSISTANCE FOR A ROAD VEHICLE

CROSS REFERENCE TO RELATED APPLICATIONS

This application is a continuation of PCT International Application No. PCT/EP2017/053711, filed Feb. 17, 2017, which claims priority under 35 U.S.C. § 119 from German Patent Application No. 10 2016 202 830.8, filed Feb. 24, 2016, the entire disclosures of which are herein expressly incorporated by reference.

BACKGROUND AND SUMMARY OF THE INVENTION

The invention relates to a device and a method for lateral guidance assistance for a road vehicle.

Known lateral guidance driver assistance systems provide the vehicle driver with assistance, for example during a lane change, in order to reduce the risk of a possible collision, in particular with third-party vehicles in the blind spot.

In known systems, in particular for lane change warning or blind spot warning, the warning region for triggering a lane change warning by the vehicle is defined as two lateral regions permanently associated with the vehicle position. In other words, warning regions are fixed geometrical regions in the vehicle coordinate system. In the event of a lane change, the warning regions are taken along with the vehicle coordinate system irrespective of the situation. A permanently defined warning region according to the prior art can therefore result in incorrect or false warnings in isolated situations. If the vehicle carries out a lane change, this lane change is not detected when determining the warning regions over the trajectory traveled, but rather is interpreted as cornering.

The invention is based on the object of providing a driver assistance system for lateral guidance assistance for a road vehicle, which system avoids false warnings, in particular.

According to the invention, the object is achieved by means of the features of the independent claims, whereas preferred developments of the invention are stated in the dependent claims.

The invention fundamentally relates to a device and a method for lateral guidance assistance for a road vehicle, wherein
the at least one warning region is shifted,
using a programmable electronic control unit,
using distance sensors for capturing obstacles to the side of and/or behind the vehicle within at least one defined warning region and
using an optical sensor device at least for capturing the road markings and/or the lane width of the current lane and/or for capturing the road markings and/or the lane width at least of the nearest neighboring lane,
on the basis of a detected lane change, that is to say is not taken along, but rather is shifted.

The invention is based on the idea of shifting at least one warning region to a defined time of a lane change that has been detected as completed.

The lane change is preferably detected using a camera system. The time of a detected lane change is preferably defined as follows or a lane change is considered to be carried out if:
the center of the front axle crosses the lane marking and/or
the center of the rear axle crosses the lane marking and/or
the center of the front axle is in a tolerance band around the lane marking and/or
the center of the rear axle is in a tolerance band around the lane marking and/or
the vector of the direction of movement points to the neighboring lane.

In one development of the invention, at least one warning region is also adapted with respect to the width of the new neighboring lane if necessary. The time and the direction of the respective lane change are preferably stored in order to define the warning region according to the corresponding lanes. A corresponding procedure should be followed in the case of a plurality of successive lane change operations.

Example: in the event of a lane change to the left, the new right-hand warning region is shifted to the lane which has been left. For the new left-hand warning region, no information relating to lane markings at the left-hand edge of the road has possibly been stored for the route which has already been covered. In order to nevertheless obtain good functional quality in this case, the approach of basing the new left-hand lane markings on the lane width is used in the event of a lane change. The procedure should be the same for a lane change to the right.

Advantages of the Invention

Customer-relevant improvement in the system performance;
Reduction in false and incorrect warnings as a result of appropriate assignment of the warning regions during or directly after the lane change;
No additional outlay on the hardware and sensor system.

Other objects, advantages and novel features of the present invention will become apparent from the following detailed description of one or more preferred embodiments when considered in conjunction with the accompanying drawings.

BRIEF DESCRIPTION OF THE DRAWINGS

One exemplary embodiment of the invention is illustrated in the drawing and is described in more detail below.

DETAILED DESCRIPTION OF THE DRAWINGS

The prior art and the problem associated therewith are first of all explained in connection with FIG. 2, as described below.

Figure 2:
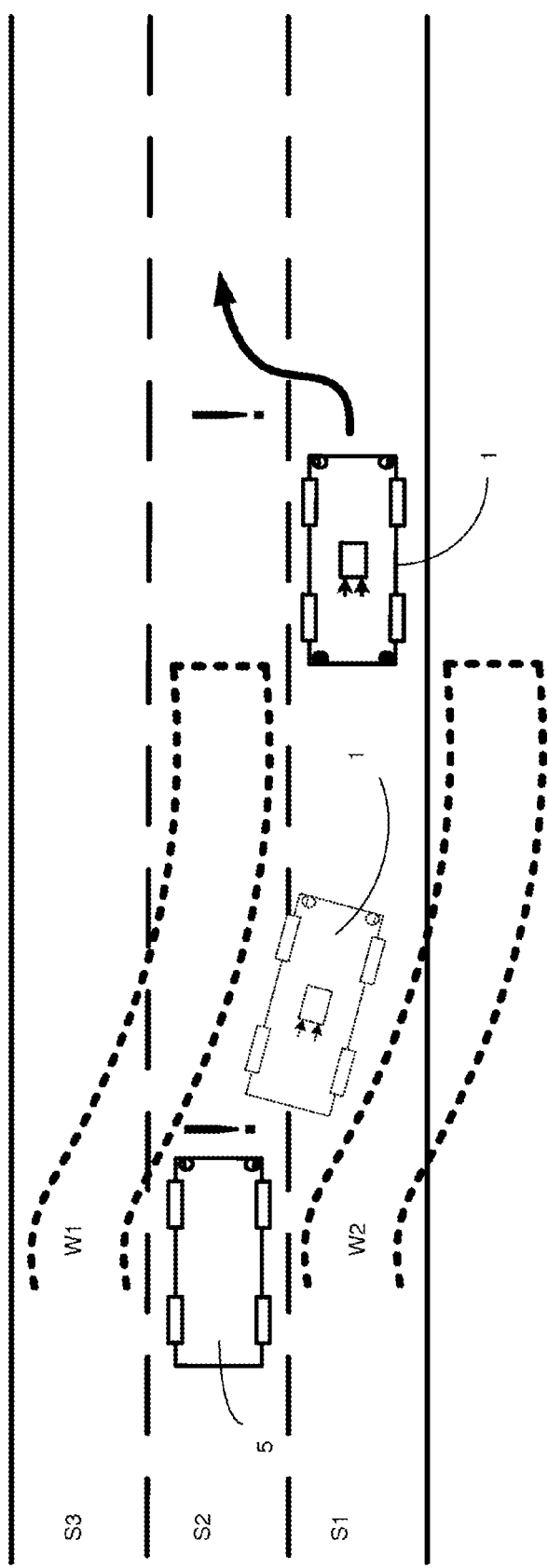
FIG. 2: shows, in comparison with FIG. 1, an exemplary embodiment which is known.

FIG. 2 illustrates a road, for example a highway, having three lanes S1, S2 and S3. The vehicle equipped with the driver assistance system (subsequently) according to the invention is represented by the vehicle 1. A third-party vehicle approaching from the rear is represented by the vehicle 5.

The vehicle 1 carries out a first lane change from the lane S2 to the lane S1. The warning regions W1 and W2, which are defined over the trajectory traveled according to the prior art, are illustrated using dashed lines. The third-party vehicle 5 is currently not in the warning region W1 or W2. In the case of warning regions which are permanently fixed to the vehicle coordinate system, they are "taken along" with the vehicle 1 independently of the vehicle environment, as if the vehicle 1 were only traveling along a bend. If the vehicle 1 then carries out a second lane change from the lane S1 back to the lane S2, the third-party vehicle 5 could enter the warning region W1 of the vehicle 1 too late.

Figure 1:
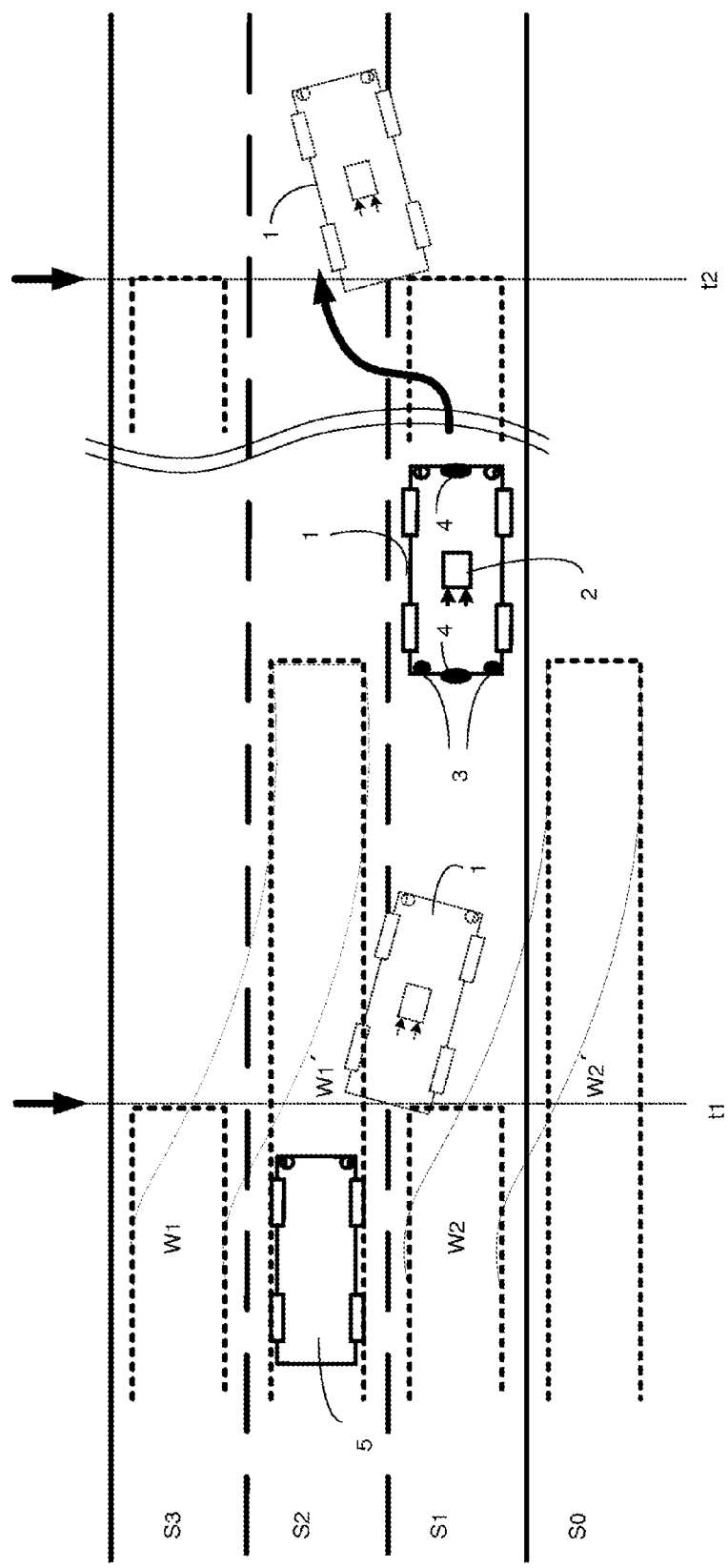
FIG. 1: shows a schematic illustration of an exemplary traffic situation with two motor vehicles which are spaced apart from one another in the direction of travel and are traveling in a laterally offset manner with respect to one another, wherein the vehicle traveling in front is equipped with the device according to the invention for lateral guidance assistance for the purpose of explaining the invention.

FIG. 1 illustrates the vehicle 1 having a programmable electronic control unit 2 and having distance sensors 3 for capturing obstacles to the side of and/or behind the vehicle 1 within a defined warning region W1 on the driver's side and within a defined warning region W2 on the passenger side (already prior art). In FIG. 1, the vehicle 1 also has a front-facing and/or rear-facing optical sensor device 4 for capturing at least the lane markings and possibly also for capturing the respective lane width of the current lane and/or for capturing the respective lane width at least of the nearest neighboring lane.

The control unit 2 is in the form of an accordingly programmed functional module (computer program product), for example.

The first lane change of the vehicle 1 is carried out from the lane S2 to the lane S1 at the time t1. The warning region W1 is in lane S3 before this lane change, and the warning region W2 is in the lane S1 before this lane change. After detecting that the road marking between the lanes S2 and S1 has been driven over at the time t1, for example if the center of the rear axle crosses the lane marking here, the warning region W1 is suddenly shifted to the lane S2 and warning region W2 is shifted to the hard shoulder S0, for example (=>see W1' and W2').

The second lane change of the vehicle 1 is carried out from the lane S1 back to the lane S2 at the time t2. After detecting that the road marking between the lanes S2 and S1 has been driven over at the time t2, the warning region W1' is suddenly changed to the lane S3 again and the warning region W2' is changed to the lane S1.

As a result of this method according to the invention, the third-party vehicle 5 is always detected in good time in the warning region W1 or W1' if necessary.

In the case of different or changing lane widths in particular, the warning region(s) W1 (or W1') and/or W2 (or W2') is/are preferably changed as follows in a first alternative with respect to its/their width and with respect to its/their distance to the vehicle 1:

If a particular width is captured in the nearest neighboring lane, the width of the warning region is adapted to this width and the distance between the warning region and the vehicle 1 is preferably also adapted to a corresponding distance.

Alternatively or additionally, in particular if the lane width at least of the nearest neighboring lane cannot be captured by means of discernible boundaries (for example in the case of a missing lane marking and guardrail), the warning region is preferably changed as above, but with the difference that the widths of the neighboring lane are inferred from the respectively detected widths of the lane.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A system for lateral guidance assistance for a vehicle, the system comprising:
   a plurality of distance sensors that detect when obstacles are within one or more warning regions to a side of and/or behind the vehicle, wherein the one or more warning regions are defined geometric regions; and
   an optical sensor device that detects a lane change of the vehicle to a new lane based on: captured lane markings and/or a lane width of a current lane of the vehicle and/or of a neighboring lane of the vehicle: and
   a programmable electronic control unit configured to define the one or more warning regions with respect to a coordinate system of the vehicle, wherein the programmable electronic control unit is further configured to laterally shift at least one of the defined one or more warning regions, relative to the vehicle, based on the detected lane change of the vehicle to the new lane such that the warning region does not track parallel to the vehicle trajectory during the lateral shift.

2. The system as claimed in claim 1, wherein the at least one of the defined warning regions is shifted according to the new lane based on the detected lane change.

3. The system as claimed in claim 1, wherein the at least one of the defined warning regions that is shifted is changed based at least in part on a width of the new lane.

4. The system as claimed in claim 2, wherein the at least one of the defined warning regions that is shifted is changed based at least in part on a width of the new lane.

5. The system as claimed in claim 1, wherein the control unit is configured to determine that the detected lane change is completed when:
   a center of a front axle of the vehicle crosses at least one of the captured lane markings,
   a center of a rear axle of the vehicle crosses at least one of the captured lane markings,
   the center of the front axle is in a tolerance band around at least one of the captured lane markings,
   the center of the rear axle is in a tolerance band around at least one of the captured lane markings, and/or
   a vector of a direction of movement of the vehicle points to the neighboring lane.

6. The system as claimed in claim 2, wherein the control unit is configured to determine that the detected lane change is completed when:
   a center of a front axle of the vehicle crosses at least one of the captured lane markings,
   a center of a rear axle of the vehicle crosses at least one of the captured lane markings,
   the center of the front axle is in a tolerance band around at least one of the captured lane markings,
   the center of the rear axle is in a tolerance band around at least one of the captured lane markings, and/or
   a vector of a direction of movement of the vehicle points to the neighboring lane.

7. The system as claimed in claim 3, wherein the control unit is configured to determine that the detected lane change is completed when:
   a center of a front axle of the vehicle crosses at least one of the captured lane markings,
   a center of a rear axle of the vehicle crosses at least one of the captured lane markings,
   the center of the front axle is in a tolerance band around at least one of the captured lane markings,
   the center of the rear axle is in a tolerance band around at least one of the captured lane markings, and/or
   a vector of a direction of movement of the vehicle points to the neighboring lane.

8. A method for lateral guidance assistance for a road vehicle comprising:

defining, by a programmable electronic control unit of the vehicle, one or more warning regions with respect to a coordinate system of the vehicle, which warning regions are geometrically defined:

capturing, by a plurality of distance sensors of the vehicle, obstacles that are within the defined one or more warning regions to a side of and/or behind the vehicle:

detecting a lane change of the vehicle to a new lane, based on lane markings and/or a lane width of a current lane of the vehicle and/or of a neighboring lane of the vehicle, as captured by an optical sensor device of the vehicle; and laterally shifting, by the programmable electronic control unit of the vehicle, at least one of the one or more defined warning regions, relative to the vehicle, based on the detected lane change of the vehicle to a new lane such that the warning region does not track parallel to the vehicle trajectory during the lateral shift.

9. The method as claimed in claim 8, wherein the at least one of the defined warning regions is shifted according to the new lane based on the detected lane change.

10. The method as claimed in claim 8, wherein the at least one of the defined warning regions that is shifted is changed based at least in part on a width of the new lane.

11. The method as claimed in claim 9, wherein the at least one of the defined warning regions that is shifted is changed based at least in part on a width of the new lane.

12. The method as claimed in claim 8, further comprising determining, by the programmable electronic control unit, that the detected lane change is completed when:
　a center of a front axle of the vehicle crosses at least one of the captured lane markings,
　a center of a rear axle of the vehicle crosses at least one of the captured lane markings,
　the center of the front axle is in a tolerance band around at least one of the captured lane markings,
　the center of the rear axle is in a tolerance band around at least one of the captured lane markings, and/or
　a vector of a direction of movement of the vehicle points to the neighboring lane.

13. The method as claimed in claim 9, further comprising determining, by the programmable electronic control unit, that the detected lane change is completed when:
　a center of a front axle of the vehicle crosses at least one of the captured lane markings,
　a center of a rear axle of the vehicle crosses at least one of the captured lane markings,
　the center of the front axle is in a tolerance band around at least one of the captured lane markings,
　the center of the rear axle is in a tolerance band around at least one of the captured lane markings, and/or
　a vector of a direction of movement of the vehicle points to the neighboring lane.

14. The method as claimed in claim 10, further comprising determining, by the programmable electronic control unit, that the detected lane change is completed when:
　a center of a front axle of the vehicle crosses at least one of the captured lane markings,
　a center of a rear axle of the vehicle crosses at least one of the captured lane markings,
　the center of the front axle is in a tolerance band around at least one of the captured lane markings,
　the center of the rear axle is in a tolerance band around at least one of the captured lane markings, and/or
　a vector of a direction of movement of the vehicle points to the neighboring lane.

15. A motor vehicle having a system configured to provide lateral guidance assistance for the vehicle, the system comprising:
　a plurality of distance sensors that detect when obstacles are within one or more warning regions to a side of and/or behind the vehicle, wherein the one or more warning regions are defined geometric regions; and
　an optical sensor device that detects a lane change of the vehicle to a new lane based on: captured lane markings and/or a lane width of a current lane of the vehicle and/or of a neighboring lane of the vehicle; and
　a programmable electronic control unit configured to define the one or more warning regions with respect to a coordinate system of the vehicle, wherein the control unit is further configured to laterally shift at least one of the defined one or more warning regions, relative to the vehicle, based on the detected lane change of the vehicle to the new lane such that the warning region does not track parallel to the vehicle trajectory during the lateral shift.

* * * * *